Aug. 26, 1941.　　　H. P. PRICE　　　2,253,649
BICYCLE BASKET
Filed Sept. 9, 1938　　　2 Sheets-Sheet 1
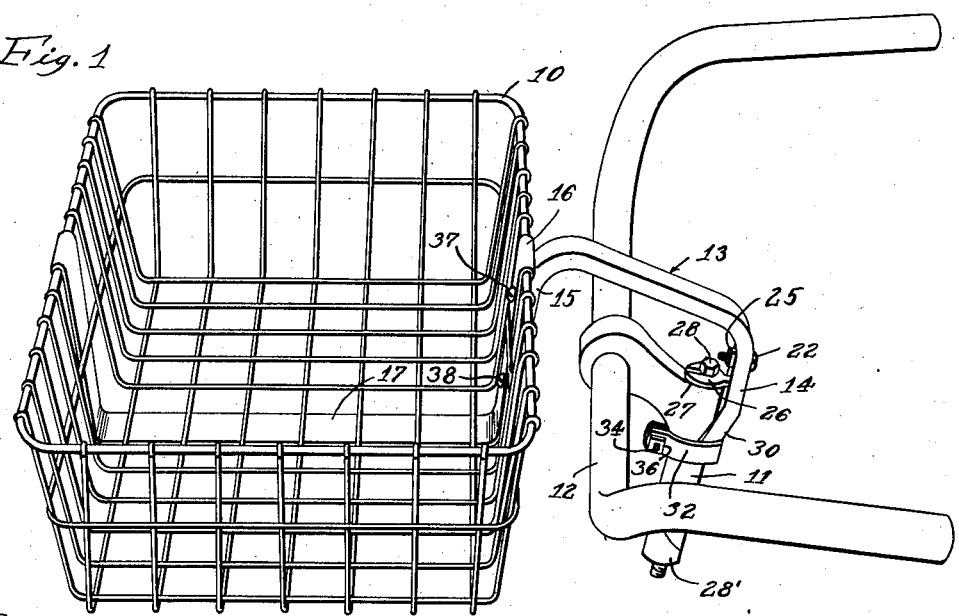
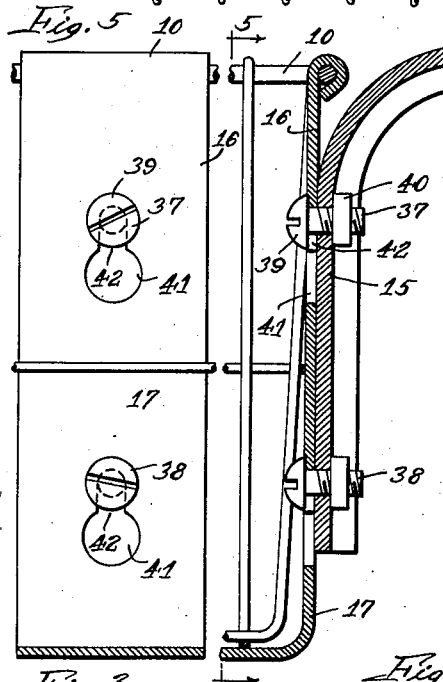
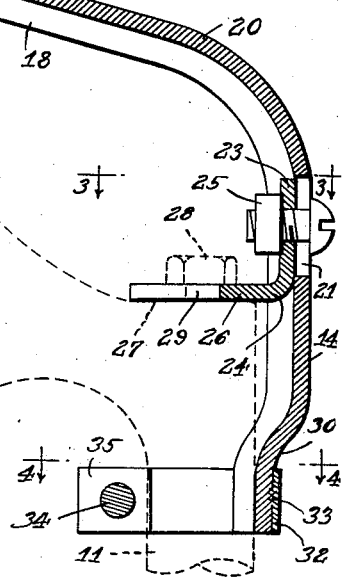
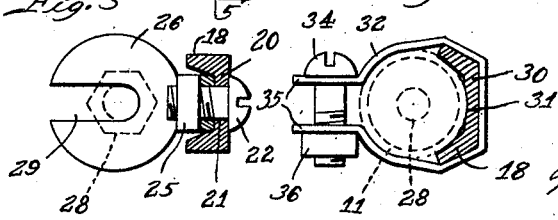
Inventor:
Hubert P. Price
By McCanna, Wintercorn & Morsbach
Attys.

Aug. 26, 1941.     H. P. PRICE     2,253,649
BICYCLE BASKET
Filed Sept. 9, 1938     2 Sheets-Sheet 2
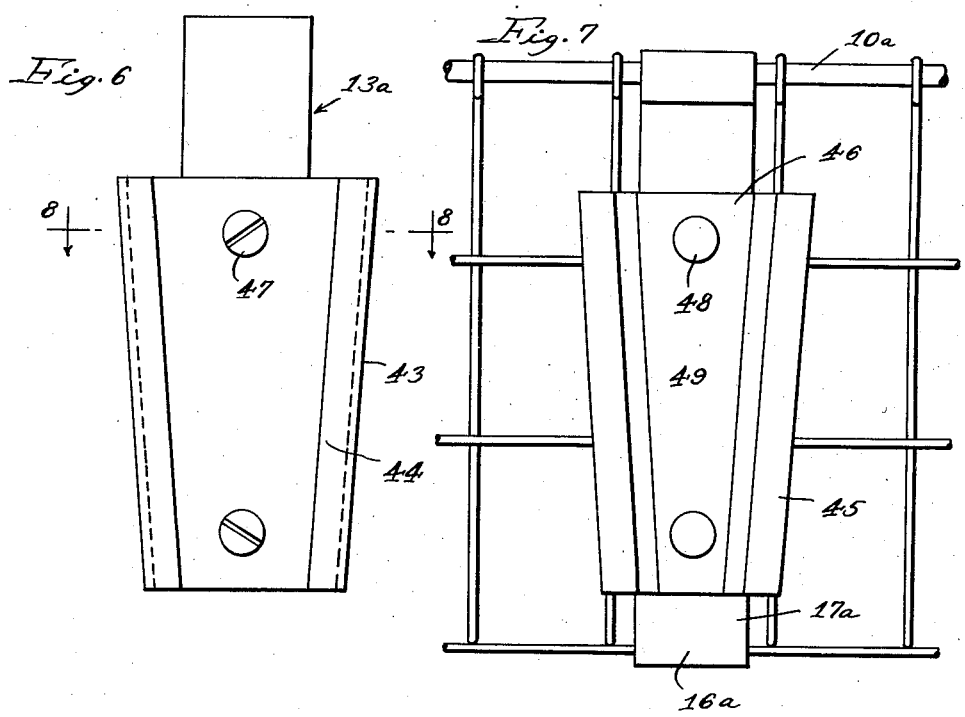
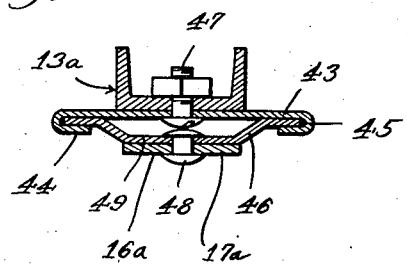
Inventor:
Hubert P. Price
By
McCanna, Wintercorn & Morsbach
Attys.

Patented Aug. 26, 1941

2,253,649

UNITED STATES PATENT OFFICE 2,253,649

BICYCLE BASKET

Hubert P. Price, Rockford, Ill., assignor to The Washburn Company, Worcester, Mass., a corporation of Massachusetts Application September 9, 1938, Serial No. 229,153

7 Claims. (Cl. 224—36)

This invention relates to bicycle baskets, and has for its principal object the provision of a supporting and attaching bracket that is practically universally adaptable to different makes and styles of handlebar stems.

A salient feature of the basket bracket is the provision for clamping the rear end thereof to the back of the stem, and supporting and securing the rear end portion by means of a clip which can be slipped under the head of the adjusting screw that is loosened for this purpose and then tightened to fasten the basket in place. With this design the bracket can be applied readily to various handlebar stems, and the bracket is shaped to project out over the handlebar so as to clear special front fork braces or any other accessories on the front of the bicycle which heretofore interfered with the application of a basket.

Another object of the invention is to provide a basket bracket formed from a channel bar so as to have the strength and rigidity necessary for the present design where the weight of the loaded basket is carried at an appreciable distance from the point of attachment of the bracket to the handlebar stem. A feature worthy of mention in this connection is the formation of the rear end of this bracket by spreading the flanges of the channel to fit the curvature of the handlebar stem where the bracket clamps thereon, whereby to retain the full structural strength throughout the length of the bracket, and particularly at the clamping point where the greatest strains are imposed in the use of the bicycle basket.

Still another object of the invention is to provide a bicycle basket which can be quickly and easily removed from or replaced on the bracket, the detachable connection involving the loosening of bolts entered through keyhole slots in a sheet metal member on the basket, to retain the basket securely enough on the bracket for regular use while permitting dismounting of the basket quickly whenever desired.

The invention is illustrated in the accompanying drawings, in which—

Figure 1 is a perspective view showing a handlebar stem with a bicycle basket detachably secured thereon in accordance with my invention;

Fig. 2 is a central vertical section through the bracket and a portion of the basket, made on a larger scale to better illustrate the construction;

Figs. 3 and 4 are horizontal sectional details on the lines 3—3 and 4—4 of Fig. 2;

Fig. 5 is a fragmentary transverse section on the line 5—5 of Fig. 2;

Fig. 6 is a front view of a keystone socket plate mounted on the front end of the bracket and constituting one part of a modified or alternative form of detachable connection for the basket;

Fig. 7 is a rear view of the companion keystone plate provided on the basket, and Fig. 8 is a horizontal section on the line 8—8 of Fig. 6 but showing the plate of Fig. 7 entered in the socket plate.

Similar reference numerals are applied to corresponding parts throughout the views.

Bicycle baskets of the kind illustrated are used quite generally for carrying packages. The basket 10 shown in Figure 1 is supported on the handlebar stem 11 out in front of the handlebar 12 by means of a bracket 13. The latter is in the form of an arch, generally U-shaped, with one downwardly reaching arm 14 disposed vertically behind and secured to the stem 11, and the other downwardly reaching arm 15 disposed vertically behind and secured to the rear upright portion 16 of the sheet metal strap 17 provided on the middle of the basket 10. The bracket 13 in accordance with my invention is made from a single piece of channel bar with the flanges 18 thereof projecting inwardly toward one another from the arms 14 and 15 and downwardly from the transverse portion 19, whereby to make for strength and rigidity and permit supporting the basket on the arm 15 while the arm 14, spaced appreciably in relation thereto, is secured to the handlebar stem. The web portion 20 of the channel bar is longitudinally slotted at 21 to receive a bolt 22 entered through the upright arm 23 of an L-shaped sheet metal clip 24 to fasten the clip to the bracket 13 in vertically adjusted position relative to the arm 14 when a nut 25 threaded on the projecting end of the bolt 22 is tightened. The bolt will be turned by means of a screw-driver in tightening the same, because the nut 25 fits too closely between the flanges 18 to permit tightening the same with a wrench (see Fig. 3). The substantially horizontal portion 26 of the bracket 24 is enlarged and made circular in form to approximately the same diameter as the flat top 27 of the handlebar stem 11 on which the clip rests when the bracket is applied to the stem. The usual adjusting screw or anchor bolt 28 provided on the handlebar stem and which, as is well known, cooperates with a wedge nut 28' down in the head of the bicycle to fasten the stem to the front wheel fork in a well known manner, is adapted to be loosened enough to allow the clip to be slipped under the head of the screw with the shank of the screw fitting in the slot 29 in the clip, whereupon the screw is then tightened to fasten the basket in place. The lower end 30 of the arm 14 is bent forwardly in offset relation with the rest of the arm and has the flanges 18 spread apart and conformed on the inner side to an arcuate form as shown at 31 in Fig. 4, approximating the curvature of the stem 11 against which this portion of the arm is adapted to be engaged as shown in Figs. 1 and 2. A U-clamp 32 is welded by its cross portion to the web 20 as at 33 and extends around the stem 11 and has a bolt 34 entered through registering holes in the spaced free ends 35 thereof, and a nut 36 is provided on the threaded end of the bolt so that the bolt can be tightened to draw the clamp 32 into tight engagement with the stem, holding the lower offset end 30 of the arm 14 firmly engaged behind the stem.

Inasmuch as the majority of handlebar stems are equipped with adjusting screws or bolts like the one shown at 28 and are otherwise adapted to fit into a clamp like the clamp 32 and provide support on the top thereof for the slotted portion 26 of the clip 24 with the screw entered in the slot 29, it is obvious that the present device is applicable to a wide range of makes and models of bicycles. The adjustability of the clip 24 afforded by the slot 21 permits locating the clip closer to or farther away from the clamp 32, accordingly as the style of the stem 11 may require or accordingly as the stem 11 and handlebar 12 may be set at a higher or lower elevation in the head of the bicycle. Then, too, the fact that the bracket 13 extends out over the handlebar and supports the basket in spaced relation to the handlebar is of advantage in clearing special front braces and other accessories which in many instances made the application of a basket impossible with the other old style supporting brackets. The present device is also more generally applicable to bicycles because of the fact that it is secured to the handlebar stem and the handlebar itself may therefore be given any special shape or position desired, and also the clevis on the handlebar stem may take any one of a variety of different forms without affecting the easy application of the present device.

Bicycle riders frequently desire to remove the basket when it is not in use, and for that reason I have made provision for detachably securing the basket to the bracket 13. In Figs. 2 and 5 I have illustrated a preferred form of detachable connection comprising bolts 37 and 38, the heads 39 of which are on the front of the arm 15, while nuts 40 threaded on the bolts, are received between the flanges 18 and are thereby held against turning. Keyhole slots 41 provided in the upright rear portion 16 of the sheet metal strap 17 on the basket 10 have their reduced ends 42 uppermost, and these slots are so spaced and of such size that the heads 39 of the two bolts may be entered through the large ends of the slots and thereafter, when the basket is lowered so as to enter the shanks of the bolts in the small ends 42 of the slots, the bolts can be tightened to secure the basket in place. The bolts will be tightened by means of a screwdriver inasmuch as the nuts 40 fit too closely between the flanges 18 to permit their being turned with a wrench. Hence, the basket will remain securely attached to the bracket until such time as it is desired to remove the same, when it will only be necessary to loosen the bolts enough to allow the basket to be raised and slipped off the bolt heads. This detachable connection is also of advantage in the shipment of the bicycle basket because when the bracket is removed the baskets can be nested.

Another detachable connecting means is shown in Figs. 6–8, in which 43 designates the keystone socket plate having inturned lateral edges 44 in downwardly converging relation in which the lateral edges 45 of a companion keystone plate 46 are adapted to have wedging engagement. While the plate 43 is illustrated as secured to the bracket 13a as by bolts 47, and the plate 46 is shown secured to the rear upright portion 16a of the middle strap 17a on the basket 10a as by rivets 48, it should be understood that the arrangement can be reversed if desired, the plate 46 being mounted on the bracket and the plate 43 on the basket. The edge portions 45 of the plate 46 are bent in offset relation to the intermediate portion 49 of the plate so as to provide clearance between the plates 43 and 46 for the heads of the rivets 48 and bolts 47 as indicated in Fig. 8. It is obvious that with this construction the application and removal of the basket is simplified because there are no bolts to be loosened and tightened. The basket is held securely enough by reason of the length of bearing contact of the plate 46 in the socket plate 43, and the fact that these plates interlock with a wedging fit and the greater the load placed in the basket the more tightly the plate 46 is caused to wedge in the inturned edges 44 of the plate 43.

It is believed the foregoing description conveys a good understanding of the objects and advantages of my invention. The appended claims have been drawn with a view to covering all legitimate modifications and adaptations.

I claim:

1. Means for supporting a bicycle basket and fastening the same detachably to the upright supporting stem of a bicycle handlebar of the type having an anchor bolt, the head of which projects from the upper end of the stem for application of a wrench, said means comprising a bracket of inverted substantially U-shape providing a front basket supporting portion, a rearwardly extending spacer and handlebar bridging portion and a rear downwardly extending bicycle attaching portion, clamp means on the lower end of said attaching portion to surround and clamp the handlebar stem, and a support projecting from said attaching portion in upwardly spaced relation to the clamp means for engaging the upper end of the handlebar stem so as to be detachably secured in place thereon under the head of the anchor bolt.

2. Means as set forth in claim 1, wherein the clamp means and support on the attaching portion of the bracket are adjustable relative to one another, closer together or farther apart, to permit application to different supporting stems.

3. Means as set forth in claim 1, wherein the clamp means is permanently fixed on the lower end of the attaching portion of said bracket and the support is vertically adjustable on said attaching portion, so as to adapt the same to application to different supporting stems.

4. Means as set forth in claim 1, wherein said bracket is of channel-shaped cross-section from end to end with the flanges thereof inwardly directed on the sides of the inverted U and downwardly directed on the cross-portion thereof, whereby to give strength and rigidity to said bracket and facilitate application to the handlebar stem by reception of said stem in the channel of the attaching portion, and wherein the support adapted to be detachably secured on top of said handlebar stem comprises an L-shaped sheet metal clip, one arm of which is held against rotary displacement between the flanges of the attaching portion of said bracket and the other arm of which projects inwardly from said attaching portion for abutment on top of the handlebar stem, and means extending through the first arm of said clip and through a slot provided in the web portion of said attaching portion for slidably adjustably fastening the clip thereto.

5. A bicycle basket support comprising a sheet metal strap member on a bicycle basket about the middle portion thereof forming a unitary part of the basket and providing an upright back portion having a plurality of vertically spaced keyhole slots provided therein, a supporting bracket of inverted U-shape providing in spaced relation a basket attaching portion and a handlebar stem attaching portion on the two arms thereof, the former having openings provided therein in vertically spaced relation to register with the keyhole slots, bolts entered in said openings and having the head end portions engageable in the slots to secure the basket detachably on said bracket for support, and means on the stem attaching portion and in vertically spaced relation to the end of said stem attaching portion for detachably securing the same to a handlebar stem, comprising a stem encircling clamp on the lower end of said attaching portion, and a support projecting from said portion above the clamp to engage on top of the handlebar stem and be fastened thereto by the stem's anchor bolt, which furthermore anchors the stem on the bicycle.

6. A bicycle basket support comprising a sheet metal strap member on a bicycle basket about the middle portion thereof forming a unitary part of the basket and providing an upright back portion, a keystone-shaped plate mounted on said back portion having the taper thereof in a vertical direction, a supporting bracket of inverted U-shape providing in spaced relation a basket attaching portion and a handlebar stem attaching portion on the two arms thereof, a companion keystone socket plate for the first-mentioned plate carried on the first of said attaching portions and adapted to receive the keystone plate in the socket thereof with a wedging fit to secure the basket detachably on the bracket for support, and means on the stem attaching portion and in vertically spaced relation to the end of said stem attaching portion for detachably securing the same to a handlebar stem, comprising a stem encircling clamp on the lower end of said attaching portion, and a support projecting from said portion above the clamp to engage on top of the handlebar stem and be fastened thereto by the stem's anchor bolt which furthermore anchors the stem on the bicycle.

7. Means for supporting a bicycle basket and fastening the same detachably to the upright supporting stem of a bicycle handlebar of the type having an anchor bolt, the head of which projects from the upper end of the stem for application of a wrench, said means comprising an elongated bar of channel-shaped cross-section bent to inverted substantially U-shape with the flanges of the channel inwardly directed on the arms of the U, one arm providing a front basket supporting portion and the other arm providing a bicycle attaching portion in the channel of which the upright supporting stem on the bicycle is adapted to fit, vertically spaced bolts entered through holes provided in the web of the basket supporting portion to secure a bicycle basket thereto, said screws having nuts threaded thereon and held against turning between the flanges of the channel of said portion, means on the lower end of the bicycle attaching portion of said bracket for detachably securing said portion to the stem on the bicycle fitting in the channel of said portion, and an L-shaped supporting element spaced upwardly from the lower end of said bicycle attaching portion having a substantially horizontal arm adapted to rest on the upper end of the stem on the bicycle and be detachably secured in place thereon under the head of the anchor bolt, the other arm of said L-shaped supporting element fitting closely between the flanges of the channel of said bicycle attaching portion along with a nut threading on a bolt entered through registering holes provided in the web on the bicycle attaching portion and the last-named arm of the supporting element.

HUBERT P. PRICE.